US006035508A

United States Patent [19]

Smith

[11] Patent Number: 6,035,508

[45] Date of Patent: Mar. 14, 2000

[54] VACUUM SEAL RELEASER AND METHOD

[76] Inventor: Gary Smith, 3635 145th Ave. NW., Andover, Minn. 55304

[21] Appl. No.: 08/980,602

[22] Filed: Dec. 1, 1997

[51] Int. Cl.[7] .............................. B23P 19/00; B25B 7/12

[52] U.S. Cl. ............................ 29/426.5; 81/3.4; 81/3.44; 81/302

[58] Field of Search ............................ 81/3.4, 3.44, 302; 29/426.1, 426.5

[56] References Cited

U.S. PATENT DOCUMENTS

| | | | |
|---|---|---|---|
| 2,647,278 | 8/1953 | Weinberger | 81/302 |
| 2,700,910 | 2/1955 | Niel | 81/302 |
| 2,861,833 | 11/1958 | Nierhaus | 81/302 |
| 4,907,477 | 3/1990 | Farber | 81/302 |
| 5,382,151 | 1/1995 | Hayes, Jr. et al. | 425/392 |

*Primary Examiner*—Timothy V. Eley
*Attorney, Agent, or Firm*—Angenehm Law Firm; N. Paul Friederichs

[57] ABSTRACT

A vacuum releaser including a pair of pivotally attached, biasing pliers, the pliers normally being biased in a tip end closed position, the tip end of the first plier member terminating in a point, the tip of the second plier member terminating in a point shaped with a recess to receive the tip end of the first plier member when the pliers are in the closed position and the method of use including the steps of providing a vacuum seal in a lidded container, mating tip ends of the closed vacuum releaser, positioning the tip ends between the rim of the lid and the side of the container, spreading the tip ends, urging the lid away from the container and allowing air to enter the container.

17 Claims, 4 Drawing Sheets

VACUUM SEAL RELEASER AND METHOD

FIELD OF THE INVENTION

This invention relates to tools for releasing a vacuum seal. More particularly, this invention relates to tools which facilitate opening of jars, bottles and similar containers enclosed with a vacuum seal lid, by first releasing the vacuum seal.

BACKGROUND OF THE INVENTION

Containers enclosed by a lid in a vacuum tight seal are very well known. Typical vacuum sealed containers of this type are often containers for food products, including jelly jars, pickle jars, condiment jars, beverage bottles, baby food jars, and the like. In some vacuum sealed containers, the lid is held on by the vacuum seal alone. Releasing the vacuum seal allows removal of the lid. In other vacuum sealed containers, the lid is also threadedly attached to the container, so that removal of the lid involves both releasing the vacuum seal and unscrewing the lid. Often, the lids of vacuum sealed containers are formed with a slight dimple at the center of the lid. When the lid is firmly vacuum sealed to the container, the dimple is recessed and inflexible, indicating that the vacuum seal has not been compromised. The vacuum sealed container protects the quality of the contents and the sealed container will normally have an extended shelf life. After the vacuum seal has been released, if the lid is reattached to the container, the dimple will be domed and flexible to thumb pressure, indicating that the vacuum seal has been broken. A domed and flexible dimple also indicates that, even if the lid has not been removed from the container, the vacuum seal has been compromised. Once the vacuum seal has been released or compromised, the contents of the container have a more limited shelf life, generally indicated by an imprinted expiration date, and the container may then also require refrigeration.

To withstand the pressure of the vacuum seal, the lid of a vacuum sealed container is generally of metal and the container is generally of glass. In order to assure the quality and shelf life of the contents, the vacuum seal must be absolutely fluid tight. Accordingly, releasing the vacuum seal to open the jar or bottle may be difficult to accomplish by manual pressure or manual twisting alone. When the lid is retained by a vacuum seal alone, a common tool for releasing the vacuum seal is one which pries up the edge of the lid away from the container. This may cause permanent deformation of the lid, such that it may be difficult to replace the lid to maintain the remaining contents of the container. When the lid is also threadedly attached, such common procedures for loosening the lid may involve tapping the lid of the jar or bottle on a counter top or on a floor surface, or hitting a corner of the lid with a utensil. Such procedures may crack the container, introducing glass chips into the product, which may be difficult to remove or may render the product unusable.

Persons with physical limitations, such as arthritis, carpal tunnel syndrome, tennis elbow, sprains, and the like and persons with weakness in their hands and arms, generally find it quite difficult to open a vacuum sealed container using such existing tools or procedures.

Accordingly, the present invention is a tool for easily releasing the vacuum seal of jars, bottles and similar containers which avoids prior difficulties and makes opening such containers quick, easy and safe, even for persons with physical limitations in their hands and arms.

SUMMARY OF THE INVENTION

A vacuum seal releaser of the present invention is comprised of first and second plier members and a biasing member. The first plier member has first and second edges, a handle end and a tip end, and inner and outer surfaces. The tip end is shaped with a prong, extending from the tip at the first plier member first edge. The prong is folded over and spaced from the inner surface at the tip end. The second plier member has first and second edges, a handle end and a tip end, and inner and outer surfaces. The first and second plier members are assembled with their inner surfaces confronting each other, and with their first and second edges, respectively, aligned with each other. The plier members are pivotally attached to each other at a pivot point spaced from the tip ends. When the tip ends are biased in a tip end closed position, the second plier member is received between the tip end and the prong of the first plier member.

In another embodiment, a vacuum seal releaser comprises a pair of pivotally attached, biasing pliers. Each plier member has a handle end and a tip end. The pliers are normally biased in a first position. The tip end of the first plier member terminates in a pair of mating points. The tip end of a second plier member also terminates in a point. When the pliers are in a tip-mated closed position, the point of the second plier member is received between the points of the first plier member.

According to another embodiment, a vacuum seal releaser comprises a pair of pivotally attached, biasing pliers. Each plier member has a handle end and a tip end. The pliers are normally biased in a first position. The tip end of the first plier member terminates in a first point with a recess in a surface thereof. The tip end of the second plier member terminates in a second point. When the pliers are in the closed position, the point of the second plier member is received within the recess of the first point.

The vacuum seal releaser of this invention comprises a pair of pivotally attached, biasing pliers. Each plier member has a handle end and a tip end. The pliers are normally biased in a first position. The tip end of the second plier member terminates in a first point with a recess for receiving the tip end of the first plier members when the plier members are in a tip end closed position.

A method of releasing a vacuum seal on a lidded vacuum sealed container according to the present invention is comprised as follows. A pair of biased confronting tips are aligned in a mated closed position. The mated tips are positioned between the lid and a side of the container, with means to hold the tip ends stationary relative to the container. The tips are biased apart, thereby urging the lid away from the container and releasing the vacuum seal.

DETAILED DESCRIPTION OF THE INVENTION

Figure 1:
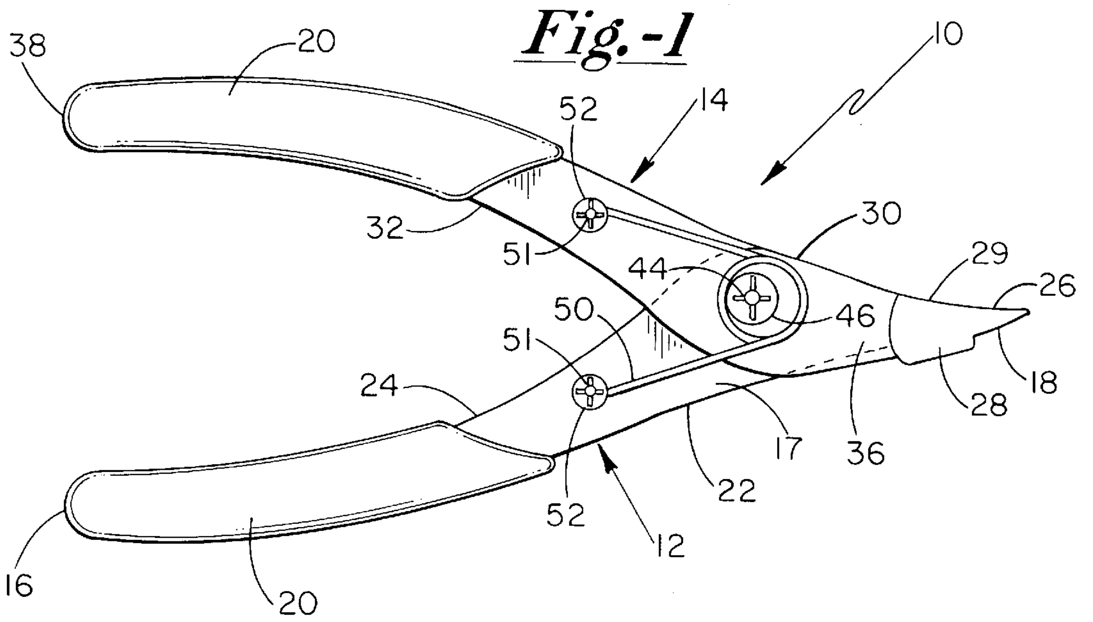
FIG. 1 illustrates a view of one side of a vacuum releaser of this invention, in a biased tip end closed position.
Figure 2:
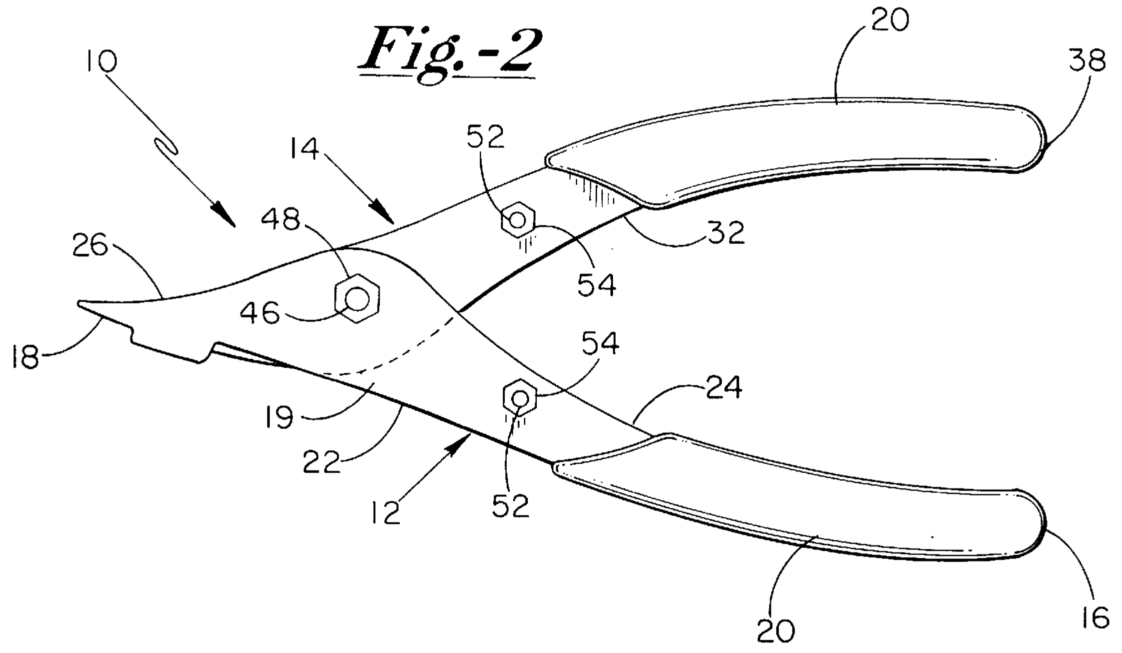
FIG. 2 illustrates a view of the opposite side of the vacuum realer shown in FIG. 1.
Figure 3:
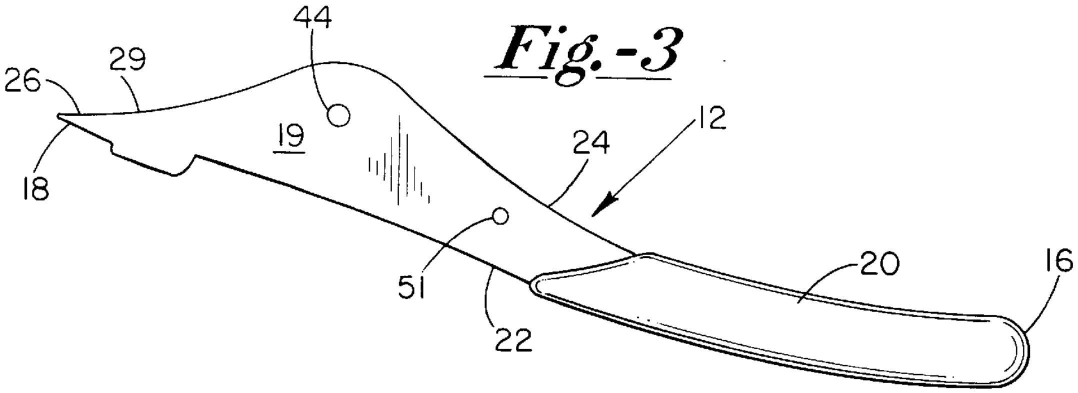
FIG. 3 shows the outer facing surface of a first plier member.
Figure 4:
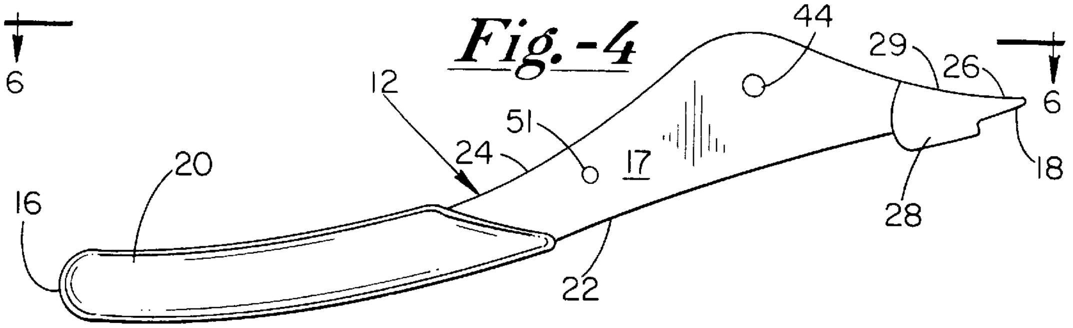
FIG. 4 shows the inner facing surface of the first plier member, showing its tip end configuration.

An embodiment of a vacuum releaser according to the present invention will now be described with reference to the accompanying drawings in FIGS. 1–9. FIGS. 1 and 2 illustrate a view of one side and an opposite side, respectively, of the vacuum releaser 10, in its normally biased tip end closed position. The vacuum releaser 10 has first and second plier members 12, 14, respectively, which can also be seen with reference to FIGS. 3–6. The plier members 12, 14 may be constructed of any suitable metal, such as aluminum, steel, or the like. The plier members 12, 14 may be made by molding, shaping, or other suitable metal forming techniques. The first plier member 12 has a handle end 16, a tip end 18, and inner and outer facing surfaces 17, 19, respectively, and is perhaps best illustrated with respect to FIGS. 3, 4 and 6. The inner and outer surfaces 17, 19 are designated with reference to the assembled vacuum releaser 10. The first plier member 12 has first and second edges 22, 24, respectively. As shown in the embodiment illustrated in FIGS. 1–9, the tip end 18 may be curved, with the concave edge 26 of the curve at the second edge 24 of the first plier member 12. The tip end 18 is shaped with a prong 28, which extends from the tip 18 at the first edge 22 of the first plier member 12. The prong 28 may have a concave edge 29, as seen in FIGS. 1–9, that may be matched to and aligned with the concave edge 26 of the tip end 18, so that the tip end 18 and the prong 28 together may have the same concave curved profile.

Figure 5:
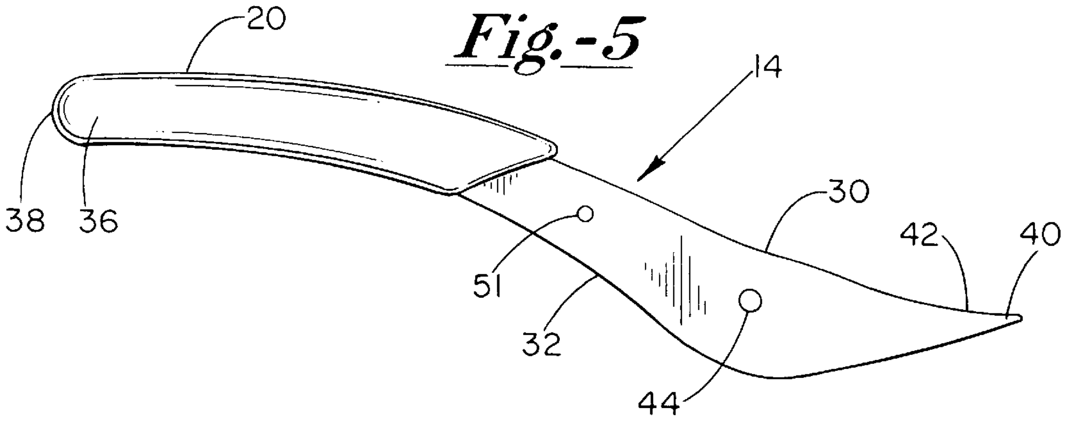
FIG. 5 illustrates the second plier member.
Figure 6:
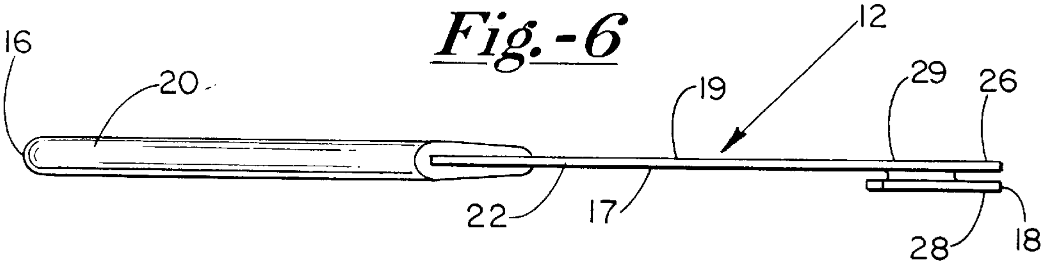
FIG. 6 is a side view of the vacuum releaser, as shown in FIG. 1, in the tip-end opened position.

The second plier member 14, as seen in FIG. 5, has first and second edges, 30, 32, respectively, inner and outer surfaces, 34, 36, respectively, and a handle end 38 and a tip end 40. The inner and outer facing surfaces 34, 36 are designated with reference to the assembled vacuum releaser 10. The two surfaces 34, 36 of the second plier member 14 are mirror images of each other. The handle ends 16, 38 of the vacuum releaser 10 may be provided with a resilient surface 20, for example, by coating the handle ends 16, 38 with a resilient polymer. The tip end 40 may be curved with the concave edge 42 of the curve at the second edge 32 of the second plier member 14.

Figure 7:
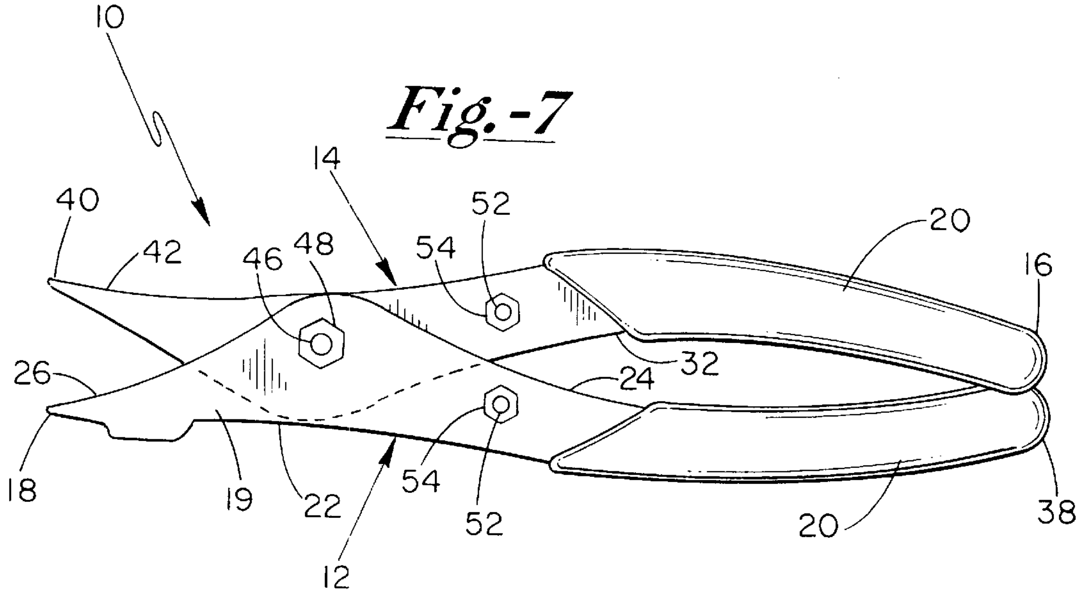
FIG. 7 is a view of the vacuum releaser, as shown in FIG. 1, in the tip-end opened position.
Figure 8:
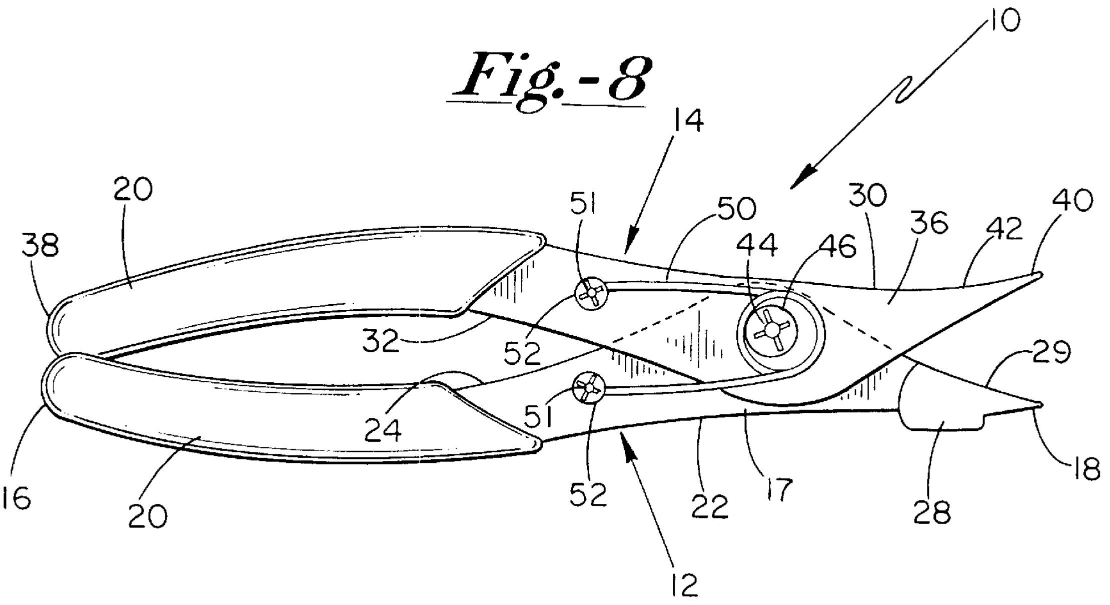
FIG. 8 is a view of the side opposite the side shown in FIG. 7, in a tip-end opened position.

The first and second plier members 12, 14 are assembled with their inner surfaces 17, 34 confronting each other, and with their first edges 22, 30 and second edge 24, 32, respectively, aligned with each other. The plier member 12, 14 are pivotally attached to each other at a pivot point 44 spaced from the tip end 18, 40, for example, by means of a screw 46 and nut 48, as can perhaps best be seen with respect to FIGS. 1, 2, 7 and 8. A biasing member pivotally biases the plier members 12, 14 in a normally closed position with the tip end 40 of the second plier member 14 received between the tip end 18 and the prong 28 of the first plier member 12, as seen in FIGS. 1 and 2. The biasing member may be a spring tension wire 50, as shown in FIGS. 1 and 7, which is retained at its ends in holes 51 by means of screws 52 and nuts 54. In this position, it can be seen that when the tip ends 18, 40 and the prong 28 each have curved profiles, as shown in the embodiment of FIGS. 1–9, they have matched aligned concave edges 26, 29, 42, so that together they have a common concave profile. Suitable methods of providing the needed spring bias to the plier members 12, 14 and of adjusting the tension will be obvious to those of skill in this art.

Figure 9:
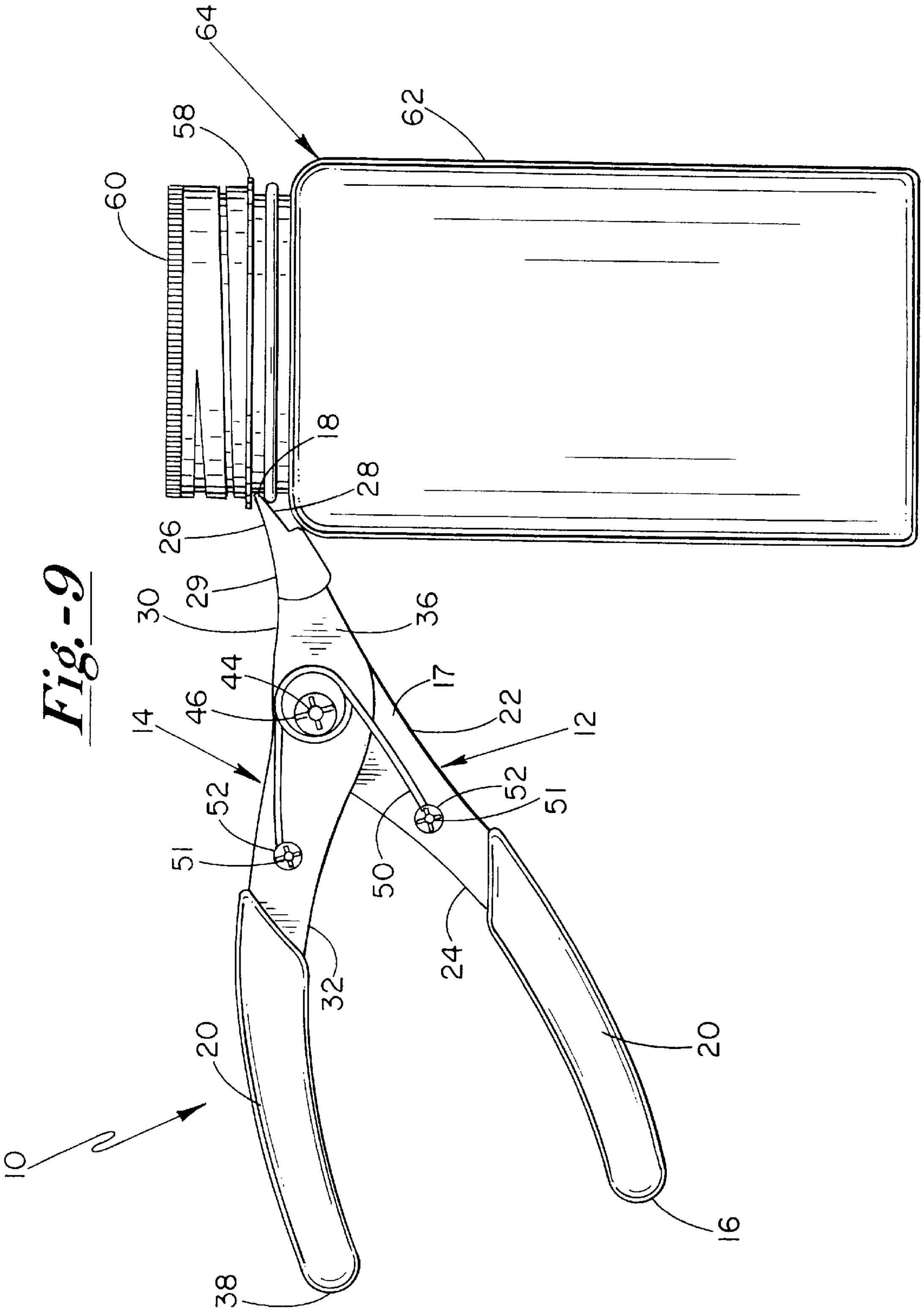
FIG. 9 is a view of the vacuum releaser of this invention in a tip end closed position and with the tip end inserted between the lid and side surface of a vacuum sealed container.

The method of using the vacuum releasing tool 10 of this invention to release the vacuum seal on a vacuum sealed container 64 with a threadedly attached lid 60 will now be described, with reference to FIG. 9. With the vacuum releaser 10 in its normally biased closed position, the mated tip ends 18, 28, 40 of the releaser 10 are positioned between the rim 58 of the lid 60 and the side 62 of the container 64. If tip end 18, 28, 40 have curved surfaces, it is preferred that the concave surface 26, 29, 42 of the mated tip ends 18, 28, 40 face the lid 60 of the container 64. The handle ends 16, 38 are then urged toward each other to move the tip end 18, 28 slightly apart from the tip end 40, thereby urging the lid 60 slightly away from the container 64, releasing or breaking the vacuum seal. With the vacuum seal now released, the lid 60 can easily be unscrewed from the container 64. If the container is of the type in which the lid is retained onto the container by the vacuum seal alone, releasing the vacuum seal allows the lid to be immediately removed.

It will of course be understood that various changes may be made in the form, details, arrangement and proportions of the product without departing from the spirit and scope of the invention.

I claim:

1. A vacuum seal releaser comprising:

a first plier member having first and second edges, a handle end and a tip end, and inner and outer surfaces, the tip end shaped with a prong, extending from the tip at the first plier member first edge, such that the prong is folded over and spaced from the inner surface at the tip end;

a second plier member having first and second edges, a handle end and a tip end, and inner and outer surfaces;

the first and second plier members assembled with their inner surfaces confronting each other, and with their first and second edges, respectively, aligned with each other, pivotally attached to each other at a pivot point spaced from the tip ends, such that when the tip ends are biased to a tip end closed configuration the second plier member is received between the tip end and prong of the first plier member; and a biasing member pivotally biasing the plier members in a first position.

2. A vacuum seal releaser according to claim 1, wherein the tips and the prong are each curved, such that when the tips and the prong are in a closed position, they together have a common curved profile, oriented with a common concave edge at the second edges of the plier members.

3. A vacuum seal releaser according to claim 1, wherein the biasing member biases the plier members in the first position, a normally closed position with the curved tip end of the second plier member received between the curved tip end and the prong of the first plier member, such that the tip ends and the prong together have a common aligned concave profile.

4. A vacuum seal releaser according to claim 1, wherein the plier members are metal.

5. A vacuum seal releaser according to claim 1, wherein the handles have a resilient surface.

6. A method of releasing a vacuum with the vacuum seal releaser according to claim 1, the method comprising:

providing a lidded vacuum sealed container;

aligning the tip ends of the releaser in a mated closed position;

positioning the releaser between a rim of the lid and a side of the container; and bringing the handle ends toward each other to move the tip ends apart, thereby urging the lid away from the container and releasing the vacuum seal.

7. A vacuum seal releaser comprising:

a pair of pivotally attached, biasing pliers, each plier member having a handle end and a tip end, the pliers normally biased in a first position;

the tip end of a first plier member terminating in a pair of mating points;

the tip end of a second plier member terminating in a point;

such that when the pliers are in a tip-mated closed position, the point-of the second plier member is received between the points of the first plier member;

the first position being a tip end closed position, with the plier members biased with the tip end of the second plier member received between the tip end and the prong of the first plier member; and the second position is a tip end opened position.

8. A vacuum seal releaser according to claim 7, wherein the handles are provided with a resilient coating.

9. A vacuum seal releaser according to claim 7, wherein the pliers are metal.

10. A method of releasing a vacuum seal with the vacuum seal releaser according to claim 7, the method comprising:

providing a lidded vacuum sealed container;

aligning the tip ends of the releaser in a mated closed position;

positioning the mated tip ends of the releaser between a rim of the lid and a side of the container; and bringing the handle ends toward each other to move the tip ends apart, thereby urging the lid away from the container and releasing the vacuum seal.

11. A vacuum seal releaser comprising:

a pair of pivotally attached, biasing pliers, each plier member having a handle end and a tip end, the pliers normally biased in a first position;

the tip end of a first plier member terminating in a first point with a recess in a surface thereof;

the tip end of a second plier member terminating in a second point; and such that when the pliers are in the closed position, the point of the second plier member is received within the recess of the first point.

12. A vacuum seal releaser according to claim 11, wherein the first position is a tip end closed position, with the plier members biased with the tip end of the second plier member received within the recess in the first plier member; and the second position is a tip end opened position.

13. A vacuum seal releaser according to claim 11, wherein the handles are provided with a resilient coating.

14. A vacuum seal releaser according to claim 11, wherein the pliers are metal.

15. A method of releasing a vacuum with the vacuum seal releaser according to claim 11, the method comprising:

providing a lidded vacuum sealed container;

aligning the tip ends of the releaser in a mated closed position;

positioning the mated tip ends of the releaser between a rim of the lid and a side of the container; and bringing the handle ends toward each other to move the tip ends apart, thereby urging the lid away from the container and releasing the vacuum seal.

16. A vacuum seal releaser comprising:

a pair of pivotally attached, biasing pliers, each plier member having a handle end and a tip end, the pliers normally biased in a first position; and the tip end of a first plier member terminating in a first point with means for receiving the tip end of the second plier member within the first point when the plier members are in a tip end closed position;

such that, when the plier members are in a tip end closed position, the tip ends may be positioned between a vacuum sealed lid and a side of a vacuum sealed container, the handle ends may be moved toward each other, thereby urging the tip ends apart, and urging the lid away from the container to release the vacuum seal.

17. A method of releasing a vacuum comprising:

providing a sealed container, the container comprising a lid portion mated with a body portion, the lid and body portion at least containing a vacuum therebetween;

aligning a pair of biased confronting tips;

positioning the tips between the lid and a side of the body portion; and biasing the tips apart, thereby urging the lid away from the body portion thereby releasing the vacuum.

* * * * *